United States Patent
Jhingan et al.

(10) Patent No.: US 7,113,948 B2
(45) Date of Patent: Sep. 26, 2006

(54) METHODS AND SYSTEMS FOR EMAIL ATTACHMENT DISTRIBUTION AND MANAGEMENT

(75) Inventors: Nikhil Jhingan, Singapore (SG); Vinod U. Vasnani, Singapore (SG); Chee Siang Lim, Singapore (SG); Neeraj Arora, Singapore (SG); E. Vijay Rao, New Delhi (IN); Amit Mongia, New Delhi (IN)

(73) Assignee: Acellion PTE Ltd., Singapore (SG)

( * ) Notice: Subject to any disclaimer, the term of this patent is extended or adjusted under 35 U.S.C. 154(b) by 544 days.

(21) Appl. No.: 10/395,022

(22) Filed: Mar. 21, 2003

(65) Prior Publication Data

US 2004/0186851 A1    Sep. 23, 2004

(51) Int. Cl.
*G06F 17/30* (2006.01)
(52) U.S. Cl. .................. 707/10; 707/102; 707/104.1; 709/203
(58) Field of Classification Search .............. 707/10, 707/102, 104.1, 103 R–103 Z; 709/203, 709/206
See application file for complete search history.

(56) References Cited

U.S. PATENT DOCUMENTS

| | | | |
|---|---|---|---|
| 5,832,208 A * | 11/1998 | Chen et al. ............... | 726/24 |
| 6,275,848 B1 | 8/2001 | Arnold | |
| 6,505,236 B1 * | 1/2003 | Pollack .................... | 709/206 |
| 6,505,237 B1 * | 1/2003 | Beyda et al. ............. | 709/206 |
| 6,560,638 B1 * | 5/2003 | Haneda et al. ........... | 709/206 |
| 6,792,544 B1 * | 9/2004 | Hashem et al. .......... | 726/30 |
| 6,839,741 B1 * | 1/2005 | Tsai ........................ | 709/217 |
| 6,898,622 B1 * | 5/2005 | Malik ...................... | 709/206 |
| 2001/0054073 A1 | 12/2001 | Ruppert et al. | |
| 2003/0001889 A1 * | 1/2003 | Darby ..................... | 345/752 |

FOREIGN PATENT DOCUMENTS

EP        1058199 A2    12/2000

* cited by examiner

*Primary Examiner*—Greta Robinson
*Assistant Examiner*—Cheryl Lewis
(74) *Attorney, Agent, or Firm*—Finnegan, Henderson, Farabow, Garrett & Dunner LLP

(57) ABSTRACT

The present invention provides is a file delivery system for transmitting files to recipients using email, which may be used with existing email infrastructures. High volumes of large file attachments may be handled by routing attachments independent of an associated email. An attachment distribution system extracts the attachments of emails at mail servers and routes them through a hosting server thereby alleviating server loading on the mail server. The system may be configured for delivery optimization, recipient authentication and delivery confirmation. The system examines emails flowing through a distributed network of mail servers, and may invoke attachment extraction based on configurable rules like attachment size and sender validity, and move the attachments over the Internet or Intranet to a remote server that is capable of delivering the attachments to the email recipients.

24 Claims, 8 Drawing Sheets

METHODS AND SYSTEMS FOR EMAIL ATTACHMENT DISTRIBUTION AND MANAGEMENT

FIELD OF THE INVENTION

The present invention relates to methods and systems for email communication and, more particularly, to methods and systems for the distribution of attachments using email.

BACKGROUND OF THE INVENTION

As computer networks develop into a means of structuring, sharing and transferring information, information systems, such as electronic mail (email), have facilitated communication and information management for information sharing and transfer. Users on a computer network have traditionally used emails to communicate private messages with each other. However, email has rapidly evolved into a new standard communication medium moving beyond the memo framework to becoming a universal tool for conducting business. The capability to send any type of data attached as a file to an email is being increasingly used, not only for dissemination of information, but also as a means of real world collaboration and email attachments have become a vital component of an organization's work-flow.

Typically, organizations use a network of computers with some operating as email servers functioning as applications responsible for receiving, transmitting, routing and archiving email. Users of such a corporate network typically have client versions of the email software for creating, sending, receiving and organizing emails installed on personal workstations. The size of email attachments used for collaboration varies considerably depending on the application but the trend is moving towards larger files, especially for rich media applications involving audio and video.

Consequently, the volume of data passing through the email systems has increased beyond the capabilities of the existing infrastructure of many corporations, resulting in strained bandwidth networks, unmanageable growth in distributed storage requirements and adverse impact on unrelated mission critical communications.

Other issues that arise include excessive data loss or latency, excessive time for downloading large files, reliance on low technology alternatives to recover from failures and lack of effective and accurate reporting capabilities. These problems are further compounded by the strained IT resources, need to extend life of existing infrastructure, desire to increase the quality of other network services, demand for an inherent fail-over mechanism for critical systems, requirement of accurate data for forecasting and planning infrastructure growth and tracking of resource utilization by business unit (i.e. department, partner, client and geographic region or specific location)

Conventional email file attachment delivery methods and systems are not efficient and difficult to manage, causing staff to lose precious productivity time transferring large files to compact disc (CD), printing hardcopy of the large files for sending by traditional courier, or using other ad-hoc manual tools such as the public File Transfer Protocol (FTP) servers and file-sharing servers which are potentially vulnerable and do not address the issue of lifecycle management of these often sensitive files.

The negative impact on operational productivity and the related infrastructure has generated a compelling need for a solution that meets both business and technical requirements. One of the most important decision-making criteria from the perspective of an enterprise is to provide a solution that supports the tools employees are most familiar with, so as to maintain the existing business process and workflow.

SUMMARY OF THE INVENTION

Email distribution methods and systems consistent with the present invention are described herein for providing a seamless, enterprise-wide file delivery solution for enabling collaboration through large email attachments by providing a framework for their file attachment, storage, transport, access and lifecycle.

In accordance with one embodiment of the invention, an attachment distribution method comprises the step of processing an email having a message portion and an attachment portion by a detacher to identify and isolate at least one of the message portion and the attachment portion of the email from the other, the email having a source system and a destination system being associated thereto. The method may also comprise the step of generating metadata in response to the email being processed, the metadata for packaging with the attachment portion of the email by the detacher to form an attachment packet, the metadata being descriptive of the email. A locator code may be generated by the detacher for storing onto a database, the database being in operative association with the detacher. A locator object may also be generated from the locator code by the detacher and embedding the locator object into the message portion of the email to form a message packet. The attachment packet is delivered to a holding server by an uploader, the attachment packet having an attachment address, the attachment address identifying the holding server and being indicative of the location of the attachment packet within the holding server, the attachment address being stored onto the database and being associated with the locator code, the uploader being operatively associated with the detacher and the uploader being in data communication with the holding server. The message packet is delivered to the destination system.

In accordance with another embodiment of the invention, an attachment distribution system comprises means for performing each step of an attachment distribution method consistent with the present invention.

BRIEF DESCRIPTION OF THE DRAWINGS

The accompanying drawings, which are incorporated in and constitute a part of this specification exemplify certain aspects of the present invention and, together with the description, serve to explain some of the principles associated with the invention.

DETAILED DESCRIPTION OF THE INVENTION

Figure 1:
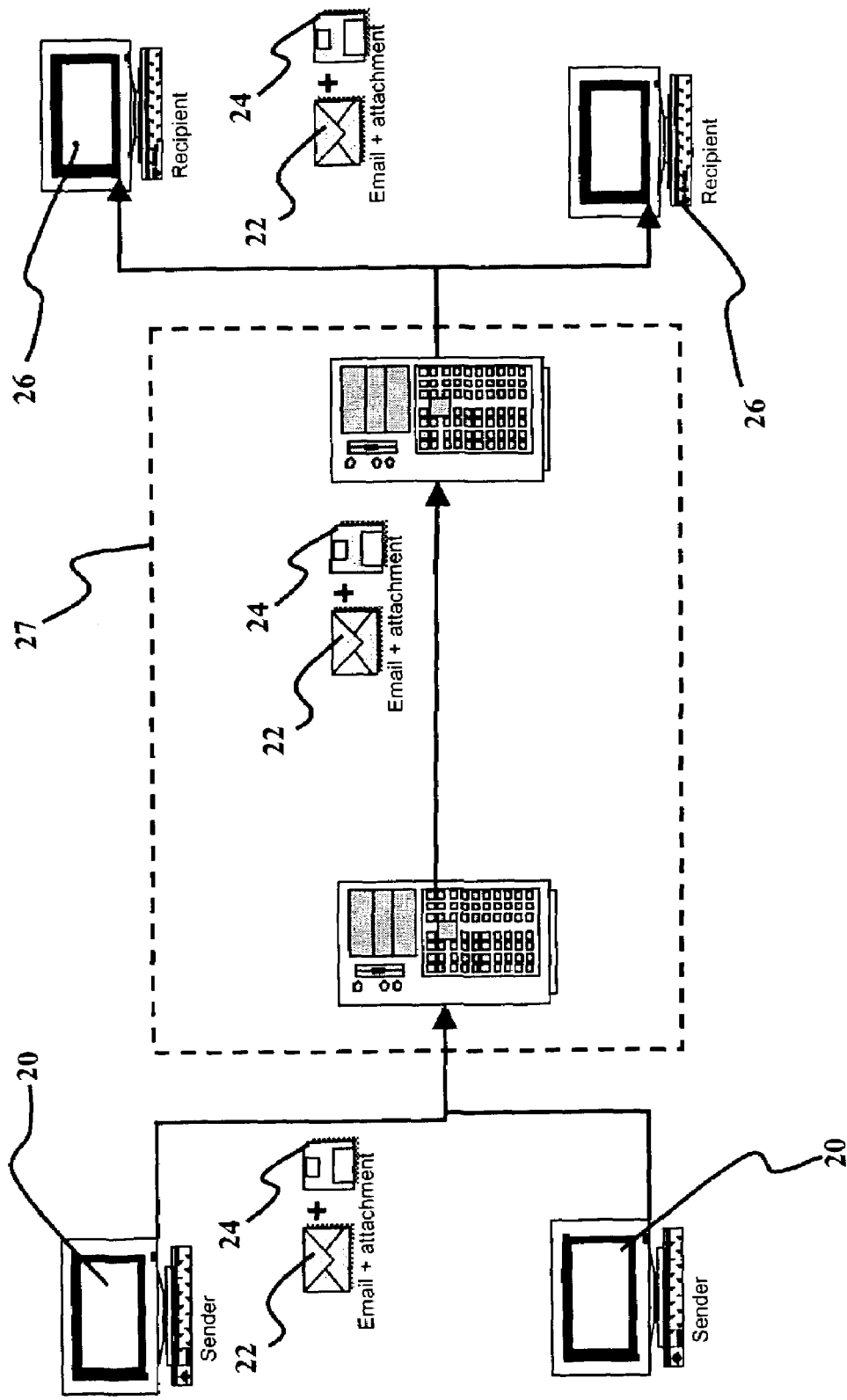
FIG. 1 shows a system flow diagram a typical network of mail servers and email clients, describing the traditional data flow of emails with attachments from internal user to both internal and external users.

Consistent with the present invention, described below are exemplary embodiments of a distributed application with components for providing file delivery of large email attachments. At least one exemplary embodiment provides a seamless, enterprise wide file delivery for enabling collaboration through large email attachments by providing a framework for their storage, transport, access, and lifecycle maintenance.

In general, file distribution systems consistent with the present invention work by extracting large file attachments from the traditional mail-flow of specific users based on configurable policies that are driven by system parameters. For example, the policy can be that only specified senders are able to have attachments extracted or only certain attachments that meet a threshold size or destination are extracted. These attachments may be further encapsulated inside larger units referred to as "attachment packets."

Certain embodiments of the present invention transfer these large attachment packets in an efficient manner to a remote server capable of communicating on any one of a set of protocols through an integrated transport system. Other embodiments of the present invention are capable of leveraging on any of a set of several protocols and methods for large file transfer. The transfer can be optionally governed by configurable parameters such as but not limited to: the upload destination, transport protocols, minimum allowable transfer rates and time-outs and upload caches. Examples of the transport protocols include HTTP, HTTPs, FTP, UDP based transport protocols. The system can further use conventional methods of transport as available on a computer network. Among other criteria, the protocols can be chosen based on security and performance needs of the enterprise. The original email may then be retransmitted to all recipients after replacing large attachments with embedded links or locator objects (URLs) which can be used to retrieve the attachment from the internet or intranet.

Certain systems consistent with the present invention help ensure that the risk of a bottleneck occurring in the process of large attachment extraction, transport, and management is reduced by processing multiple emails simultaneously, such that even while attachments are being extracted, packaged, and transferred, other emails may continue to be examined and passed through the system.

Each set of attachments to an email may be treated as an attachment packet. Along with the attachments, each attachment package may optionally contain meta information regarding the package itself. For example, this meta information can include, but is not limited to, the sender's email address or content, information identifying one or more recipients, and a list of attachments as well as attributes such as size and type. The meta information can optionally include various attributes of the email itself such return receipt.

Certain embodiments of the present invention enable seamless usage of existing email workflow for collaboration on large files without disrupting or impacting other applications and services. Additionally, certain embodiments may allow policy-based management of attachments through optional parameters like threshold of attachment size for extraction and attachment lifetime on storage location. Certain systems may also be configured to have separate rules for inbound and outbound traffic. An option may be provided for recipient authentication based on enterprise directory standards like the Lightweight Directory Access Protocol (LDAP) to prevent attachment forwarding, delivery confirmation to allow the sender of emails to be notified when recipients download their email attachments and automated background replication of attachments to recipient preferred remote server. An option may also be provided for securing of the previously non-secured method of collaboration via email attachments.

One example of a distributed network of mail servers and email clients typically used by a geographically spread out enterprise is shown in FIG. 1. In this example, a sender 20 sends out an email 22 with an attachment 24 to multiple recipients 26 over a network 27 as shown in FIG. 1. It can be seen that the email 22 with the attachment 24 traverses a tortuous and inefficient route over the network of mail servers until the email 22 and the attachment 24 are received by all the recipients 26.

Figure 2:
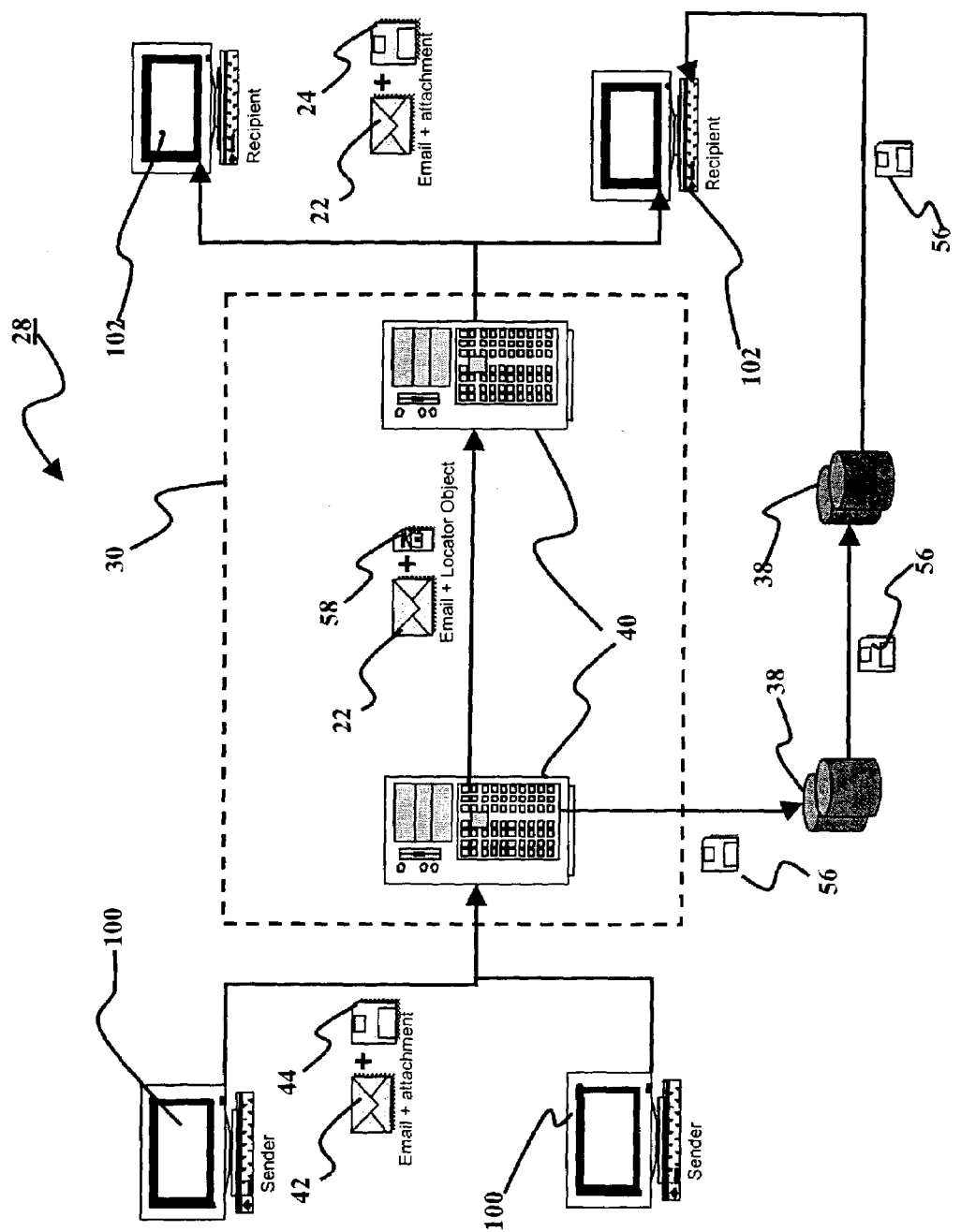
FIG. 2 shows a system flow diagram of one exemplary attachment distribution system for managing data flow using an attachment distribution method according to at least one embodiment of the invention.

FIG. 2 illustrates one exemplary embodiment of the present invention, that is, an attachment distribution system 28 comprising mail servers in a network configuration similar to that shown in FIG. 1. However, in network 30 of FIG. 2, choking by attachment traffic and bottlenecks on the servers are avoided, resulting in optimal delivery of attachments to recipient systems 102.

Figure 3:
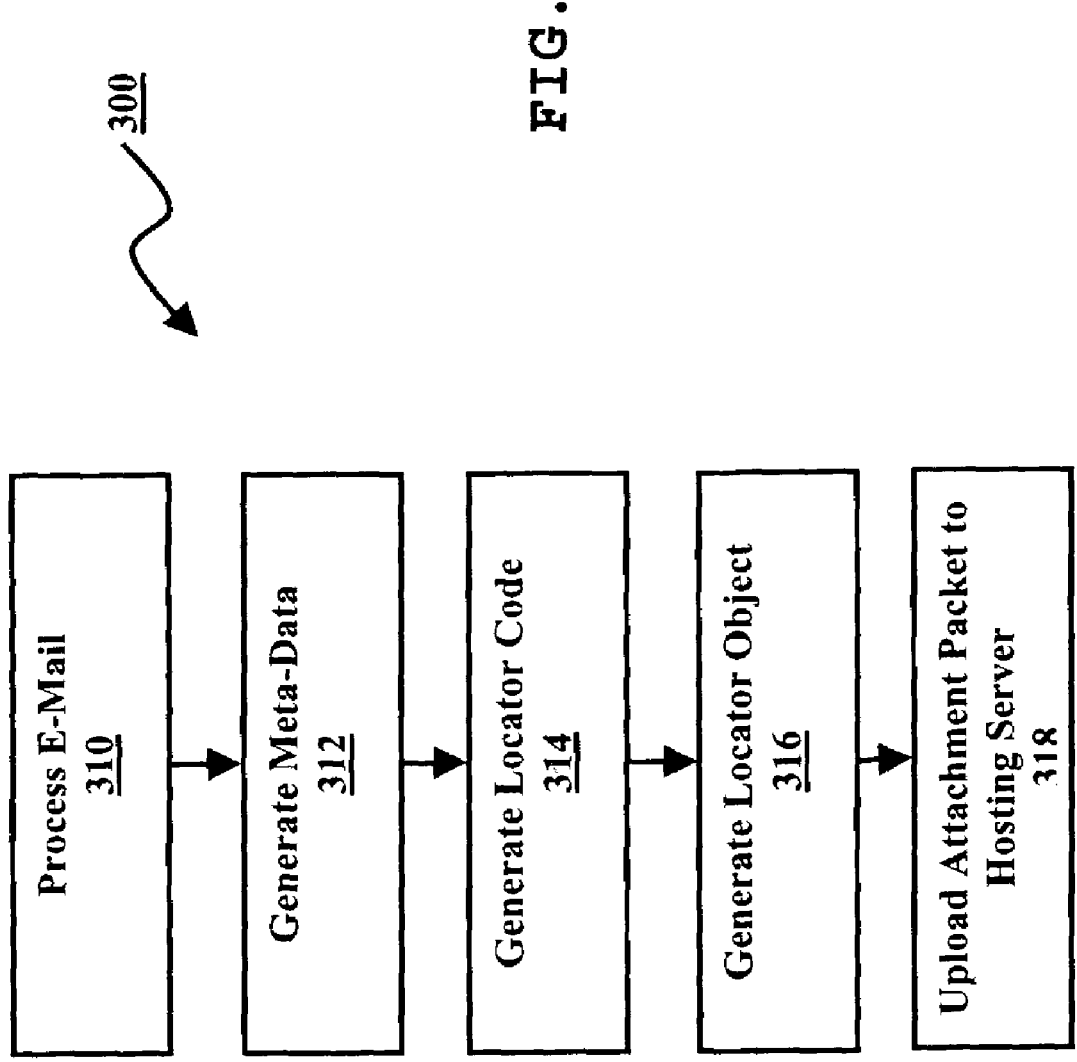
FIG. 3 shows a process flow diagram of an attachment distribution method that may be used by the attachment distribution system of FIG. 2.
Figure 4:
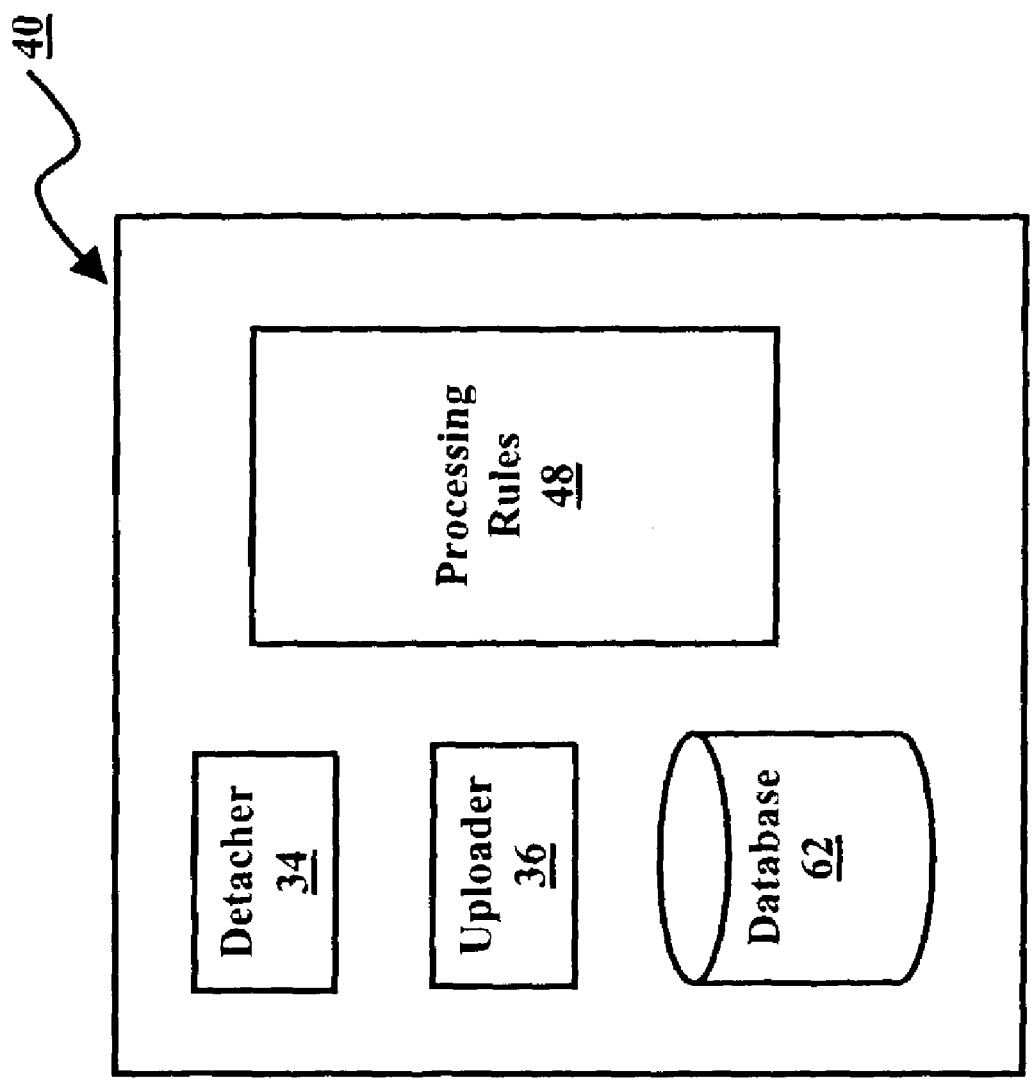
FIG. 4 shows a system diagram of a mail server of the attachment distribution system of FIG. 2.

FIG. 3 illustrates an attachment distribution method 300, as may be used by, and with reference to, the attachment distribution system 28 of FIG. 2. Attachment distribution method 300 illustrates one exemplary method for managing the flow of email attachments, such as over network 30. As shown in FIGS. 2 and 4, attachment distribution system 28 may comprise a detacher 34, an uploader 36, and at least one hosting server 38. Each of detacher 34 and uploader 36 may be a software module that may reside within the attachment distribution system 28 on a mail server 40 as shown in FIG. 4.

When an email 42 containing one or more attachments 44 is received from a sender system 100 by the attachment distribution system 28, email 42 may be processed 42 in accordance with step 310 of FIG. 3 by, for example, detacher 34 of FIG. 2. The email 42 contains a message and the attachment 44 portions. The message and/or attachment 44 portions of email 42 are identified, such as by detacher 34. In certain embodiments, as shown in step 310, the attachment 44 may be detached from the email 42 only when the email 42 complies with a set of processing rules 48.

Generally, detacher 34 will only engage with an email that has file attachments 44. Each email 42 received may be categorized into incoming email, which includes emails from a sender system 100 external to the organization, or outgoing email, which includes emails from a sender system 100 within the organization.

A first processing rule may be used to enable the detacher 34 to engage emails 42 from a sender system 100 that is recognized as a 'Qualified Sender system 100' for outgoing emails. An application administrator may provide a list of Qualified Sender systems 100.

A second processing rule may be used to regulate processing of the email 42 based on the size of the attachment 44. The second processing rule, for example, may set a processing threshold such that email 42 will not be processed if the size of the attachment 44 is smaller than the processing threshold. However, the detacher 34 may proceed to process the attachment 44 when the size of the email 42 is at least of the processing threshold. The second processing rule may prevent smaller attachments 44 from being detached from the email 42 due to their insignificance when compared with the bandwidth of the network 30 carrying the attachments 44.

Certain embodiments of the present invention include multiple processing thresholds for catering to different types of emails 42. For example, in certain embodiments, there could be three distinct processing thresholds that can be set to govern whether or not an attachment is detached from the email: An internal threshold may be applied if the email 42 is destined for recipient systems 102 internal to the enterprise; an external threshold may be applied if the email 42 is destined for recipient systems 102 external to the enterprise; and an inbound threshold may be applied to all inbound email 42.

In certain cases, such as where an email 42 is sent to both internal and external recipient systems 102, a threshold parameter may be used for determining which processing threshold to apply for all emails. The threshold parameter can be universal for a given email, so if there are both internal and external recipient systems 102 of that email, any one processing threshold being exceeded may result in the corresponding attachment 44 being removed from the email 42 for all recipient systems 102. The threshold parameter can also be applied on the sum total of the attachments in the email. Alternatively, the threshold parameter is used for applying the processing threshold to the largest attachment 44 in the email 42 or to each attachment 44 in the email 42. Emails that do not qualify for detachment based on the first and/or second processing rules may be sent to the intended recipient systems 102 without any further examination or processing in a transparent manner.

Once an email 42 qualifies for attachment 44 extraction, the meta-data related to the email is extracted and/or generated by, for example, detacher 34. The meta-data may include, for example, data from the email header and from the profile of the sender system 100 residing on the mail server 40. Attachment 44 is removed from the email 42 by, for example, detacher 34. In step 312 of FIG. 3, the meta-data may be compiled into a meta-file and combined with the extracted attachment 44 to form an attachment packet 56. The attachment packet 56 may be written to a pre-configured package directory on the mail server 40 for subsequent uploading onto the hosting server 38. The specific meta-data gathered may include, but is not limited to, the sender system 100 email address, recipient system list, mail server profile for internal recipient systems 102, including department and default location, if available, and attachment file name and extension.

In certain embodiments, the extracted attachment 44 is replaced with a locator object 58, such as by detacher 34. In step 314 of FIG. 3, a locator code is generated by, for example detacher 34. The locator code may be a secured uniform resource locator (secured URL). The locator code may be stored onto a database 62 and associated with the extracted attachment 44. In step 316, a locator object 58 may be generated from the locator code, also for example by detacher 34. The locator object 58 may be referred to as a "link" for embedding into an email.

In an email example, a locator object may be generated from a locator code being associated with an attachment. The locator object may be embedded as a linked object within the email and sent to a recipient system 102. At the recipient system 102, a user may activate the locator object embedded within the email. Upon the locator object being activated by the user, in the email example, the attachment associated with the locator code may be downloaded from a server to the recipient system 102.

In step 314, the locator object 58 may be generated dynamically by, for example, detacher 34, and may encompass security features to prevent unauthorized access to the attachment packet 56. Exemplary security features include, but are not limited to, cryptographic tokens, shared keys and other authentication mechanisms. For example, locator object 58 may use a shared key as a means of authentication on a remote storage server and a 128-bit encryption for secured delivery of the attachment packet 56. The security features can further include an expiry date and time. The expiry date and time establishes the life of the locator object 58, subsequent to which the attachment packet 56 may not be downloadable from a server storing the attachment packet 56.

The locator code for generating the locator object 58 can include parameters to specify whether the recipient system 102 should be verified before downloading the attachment and whether a download confirmation should be sent to the sender system 100 upon successful downloading of the attachment packet 56 by the recipient system 102.

In certain embodiments, detacher 34 may be integrated with the mail server 40 at a low system level. Such placement may prevent interference with existing auxiliary email services such as virus scanning and other mail scanning technologies.

Detacher 34 may be adapted for processing multiple emails simultaneously, such that even when one email are being processed, other emails continue to be examined and passed through the system.

Uploader 36 may be an application responsible for uploading the attachment packet 56 generated by the detacher 34 from the mail server 40 to the hosting server 38. In step 318 of FIG. 3, the attachment packet 56 may be uploaded to the hosting server 38 by, for example, uploader 36 as shown in FIG. 2. The meta-data may be used by mail server 40 and hosting server 38 for optimizing delivery of and managing access to the attachment packet 56.

Uploader 36 operates based on a number of parameters such as, for example, a server list 64 containing a plurality of servers. The servers contained in the server list 64 may be arranged in sequence based on preference. One server may be selected from the server list 64 and identified as the hosting server 38. Such selection may be performed, for example, by uploader 36.

Before uploading occurs, the readiness of the selected server may first be determined. In some situations, the selected server may not be accessible and/or ready. When it is determined that the selected server is not ready, by for example uploader 36, another server may be selected from the server list 64 and identified as the hosting server 38. Upon determining that a selected server is ready, the attachment packet 56 is uploaded onto the hosting server 38 by, for example, uploader 36.

In certain embodiments, uploader 36 is an integrated transport system, capable of transmitting data using any known file transfer protocol and/or method for large file transfer. For example, uploader 36 can communicate with the hosting server 38 using the HTTP, HTTPS, FTP or the like file transfer protocols supported by the mail server 40 and hosting server 38. The file transfer protocol used may depend on a parameter or by determined by the needs of the application. For example, HTTP or FTP may be the best option for efficient file transfer and may be the best option for file transfer over the Internet as it may ensure transport layer security.

Additionally, certain embodiments of uploader 36 and hosting server 38 may use user-based authentication for securing of the file transfer operations.

In some cases, uploader 36 may be capable of improving efficiency of uploading of the attachment packet 56 by parallel processing. Parallel processing is enabled by leveraging on multiple network connections, for example, by being configured to use multiple HTTPS tunnels for uploading multiple attachment packets 56 to corresponding hosting servers 38. The number of HTTPS tunnels may be determined by balancing system performance with system resource utilization, for example bandwidth, CPU and memory on the hosting system 38.

Additionally, a threshold can be determined above which, the attachment packet 56 may be broken into several smaller portions. The several smaller portions may be uploaded in parts separately to the hosting server 38 wherein the several smaller portions are joined to re-generate the original attachment packet 56. This feature would allow the capability of resuming broken uploads by only uploading the portions of a file that could not be uploaded due to a bad or broken connection, which may in turn improve efficiency.

In certain embodiments consistent with the present invention, attachment package 56 may be "fingerprinted" and compared with packages already stored or previously uploaded. "Fingerprinting" may be performed by, for example, hashing the contents of the attachment package using conventional hashing technologies, such as MD5. By doing so, certain embodiments of the present invention may avoid uploading and storing an attachment packet twice, thereby saving bandwidth and/or storage space.

Certain embodiments of the present invention may involve other configurable parameters, such as thresholds for minimum allowable transfer rate and time allowable for file transfers to the hosting server 38. Such exemplary thresholds may be used to prevent excessive upload times and allow recovery from file transfers that should be aborted due poor connectivity.

Other embodiments may employ an optional parameter such as an uploader cache setting which decides how long package contents will be held on the mail server 40 after their successful upload. This type of parameter may be used, for example, by an administrator wanting to manage the balance between safety and storage utilization on the mail server 40.

Uploader 36 may also be tasked with updating the configuration of detacher 34. It supports the application of any changes in the aforementioned configurable parameters. Components may be retrieved from a central server for updating the detacher 34 application.

Additionally, uploader 36 may contain logging and error reporting features that allow the administrator to monitor the application performance and set up automated application support. Activities of the attachment distribution system 28 may be logged at different configurable levels and it is may also be possible to configure the time that log files remain available. Such parameters may be useful, for example, for diagnostics purposes, thereby allowing the retention of critical information while controlling data storage growth. The generated logs can be periodically transferred from the mail server 40 to the hosting server 30 for mining and for generating reports. Error reporting can be automated through an email notification system. For example, severe error conditions may be reported via email to the configurable administrator from a configurable sender at a configurable frequency.

The hosting server 38 of FIG. 2 provides a remote file system like functionality for uploading, retrieving and obtaining a listing of files besides allowing typical operations like move or delete on the search result set. Such hosting servers 38 include, but are not limited to, HTTP servers, FTP servers or the like servers running any protocol that is capable of storing and delivering files.

In addition to providing file system functionality in a secure, fast and reliable manner, hosting server 38 may also provide facilities for user registration and authentication by maintaining a user database.

Information provided by the detacher 34, in the meta-data of the attachment packet 56, may be used by the hosting server 38 to drive policies for storage, replication, transport, access, and life-cycle management. The meta-data in the attachment packet 56 may contain information on the sender system 100, a recipient system list, the profile of the mail server 40 for internal recipient systems 102, including department and location and file name and extension.

The hosting server 38 receiving the attachment packet 56 can optionally replicate the uploaded attachments to the server of choice of the recipient systems 102 whose profiles may exist either in the organization's directory server or in the registered user database. Such replication can optionally occur immediately after the upload to allow the minimum download time for each recipient system 102.

In certain embodiments, the locator object 58 inserted in the email can be activated at the recipient system 102 to retrieve the attachment packet 56 associated with the locator object 58. Such retrieval may occur either directly without authentication or after being password authenticated as so configured on the system. This configuration may be done either on the hosting server 38 or may, for example, be encapsulated as a component in the locator object 58.

If the recipient system 102 authentication is required, then the authentication may be performed by querying predetermined directory servers like the LDAP server for the organization or by searching in the registered user database. The hosting server 38 can prompt a user to enter a email address which would can be further verified against the original recipient system list obtained from the meta-data of the email. The recipient system 102 may also be required to enter a password for verification by the hosting server 38. This provides a framework for verifying the recipient system 102 before the download so that only the original recipient systems 102 can download the attachment packet 56.

In situations where the recipient system 102 does not exist, then a new user profile is created for which the user can submit a password and preferred location for future deliveries. If the email address is not found in the recipient system list or the password is incorrect then the download is disallowed, otherwise, the locator object 58 is authenticated for validity by the hosting server 38.

Thus, the hosting server 38 can be configured to disable download by any recipient systems 102 not on the original mailing list via mail forwarding in addition to the authentication mechanism for file delivery described above.

If the sender system 100 requested "Return Receipt" using a standard email client feature, the hosting server 38 can send a download confirmation the sender system 100 in the form of an email after successfully downloading the attachment packet 56 by recipient system 102.

File life-cycle management may be governed by parameters and can be globally enforced, or enforced on a file or hosting server-specific basis. This policy can be driven by frequency of access or timeframe. For example, the attachment distribution system 28 could be configured so that the attachment packet 56 is deleted after all recipient systems 102 have downloaded the file, or simply after two weeks regardless of access.

Administration of the attachment distribution system 28 may involve the setting up and modification of the various parameters that decide the policies governing the functioning of the attachment distribution system 28. Administration may be performed manually by an administrator on each the mail server 40. The administrator can set or change the servers on the server list 64, thereby changing the hosting server 38. The administrator can change the processing rules 48 for the attachment packet 56. The administrator can add or remove qualified sender systems 100 whose mails will be intercepted by the system. The administrator can decide the life of the attachment packet 56 on the mail server 40. The administrator can set or change the time for which the links inserted in the mail will cease to be valid after insertion.

The administrator can enable or disable automated notification by email upon each successful download. The administrator can enable or disable the feature of recipient system 102 authentication, for example, the ability to configure whether or not a recipient system 102 must enter a password before downloading an attachment packet 56.

Uploader 36 may comprise a polling feature which may enable hosting server 38 to make changes to the parameters of the attachment distribution system 28. Such changes may be reflected immediately upon the detection of the changes to the parameters by the uploader 36 on each mail server 40.

The hosting server 38 can also provide administration of the registered recipient systems 102, addition of new mail recipient system 102 profiles to the database and setting or changing of recipient system 102 profile information such as password & download location preference. For example, administrators could view sender systems 100 who have used the attachment distribution system 28 and the mail servers 40 which have intercepted the mails sent by them. The logs uploaded by the uploader 36 and the information maintained by the hosting server 38 can be used to create reports at the file level, to provide a comprehensive understanding of attachment packet 56 resources, their availability, usage and their cost. The same can be done by any event capturing software in place of logs at the hosting server, in essence it is the capturing and processing of events that allow such reports to be created.

The attachment upload events captured in such logs could be used to generate access statistics details on a per sender system 100 basis. Resources, such as bandwidth and storage usage, can be quantified to track and control expense as well as monitor business practices on a hosting server 38 basis as well as per sender system 100 basis. The download logs can be used to create reports that help track individual attachments by date, recipient system 102 user-id, file size and time for download.

Figure 5:
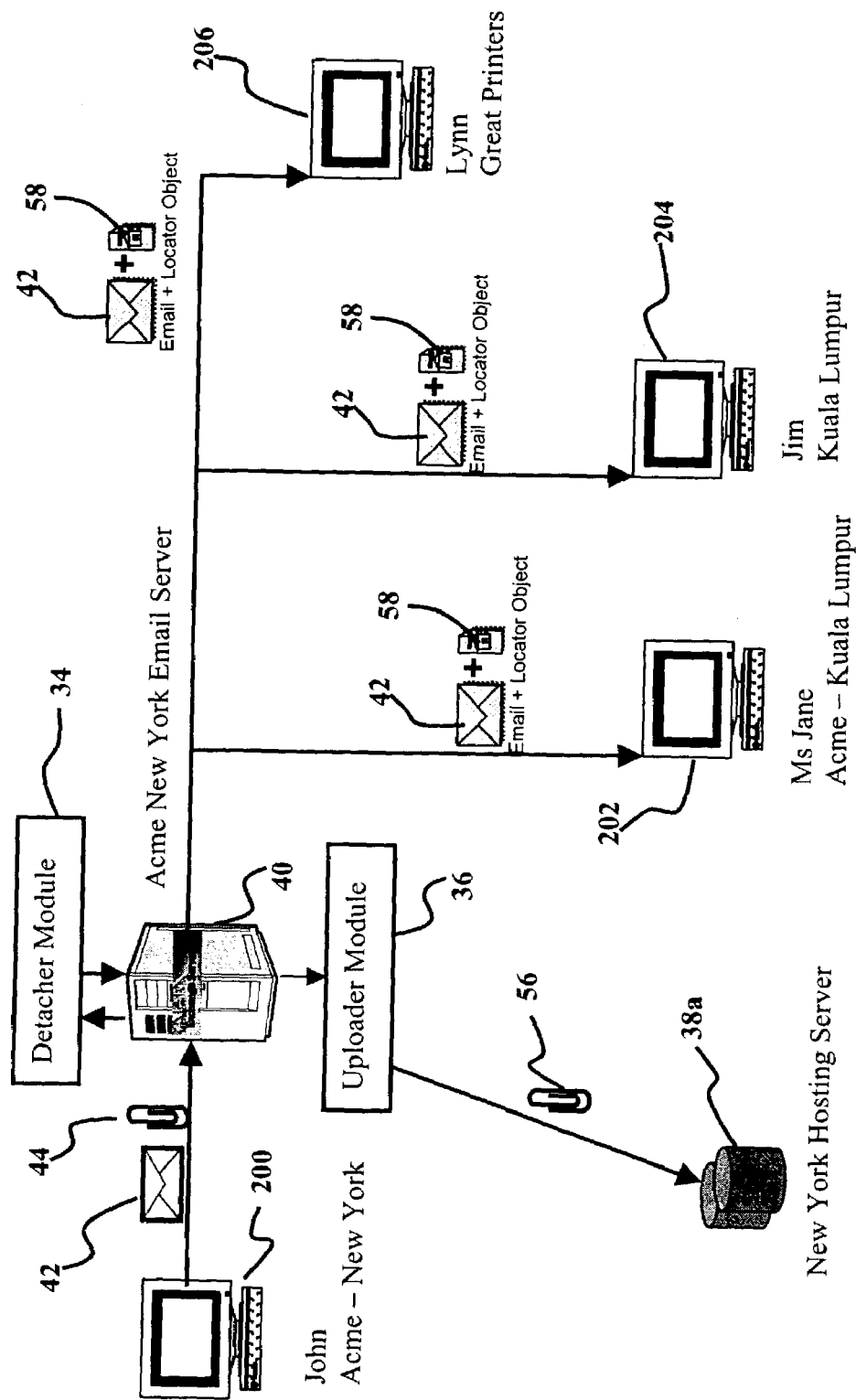
FIGS. 5, 6, 7, and 8 show an exemplary application of the attachment distribution system of FIG. 2 and the attachment distribution method of FIG. 3.

Described hereinafter with reference to FIGS. 5 to 8, is an example of an application of the attachment distribution system 28. In this example and as shown in FIG. 5, John 200, an employee of ACME corporation in New York sends an email 42 with a large-sized attachment 44 to three recipients, namely Jane 202, a co-worker in Kuala Lumpur, Jim 204, who works for a customer of ACME in Kuala Lumpur and Lynn 206, an employee of Great Printers in Taiwan.

FIG. 5 shows the sequence of events triggered when John 200 sends out the mail. John's 200 mail reaches the New York mail server 40 in the ACME corporate network where the email 42 is processed by the detacher 34 which finds that the mail attachment size of the attachment 44 is larger than the size allowed to be sent unhindered. The detacher 34 also checks if John's 200 email address is in the list of qualified senders and upon verification of this fact proceeds to extract the attachment portion 44 from the email, replace it with a locator object 58, and create an attachment packet 56 containing the attachment portion 44 of the email 42 and meta-data containing information extracted from the email 42 about the recipient systems 102. The email 42 is then sent out in the normal manner to all the three recipients with the attachment 44 being replaced by the locator object 58, for example a URL. Meanwhile, uploader 36 may be looking for new attachment packets 56 and, upon finding an attachment packet 56, immediately uploads the attachment packet 56 to the hosting server it is configured for which happens to be a New York hosting server 38a. It is to be noted that, in this example, only Jane 202 has used a particular server so far for receiving attachment packets 56 and is registered with a recipient profile.

Figure 6:
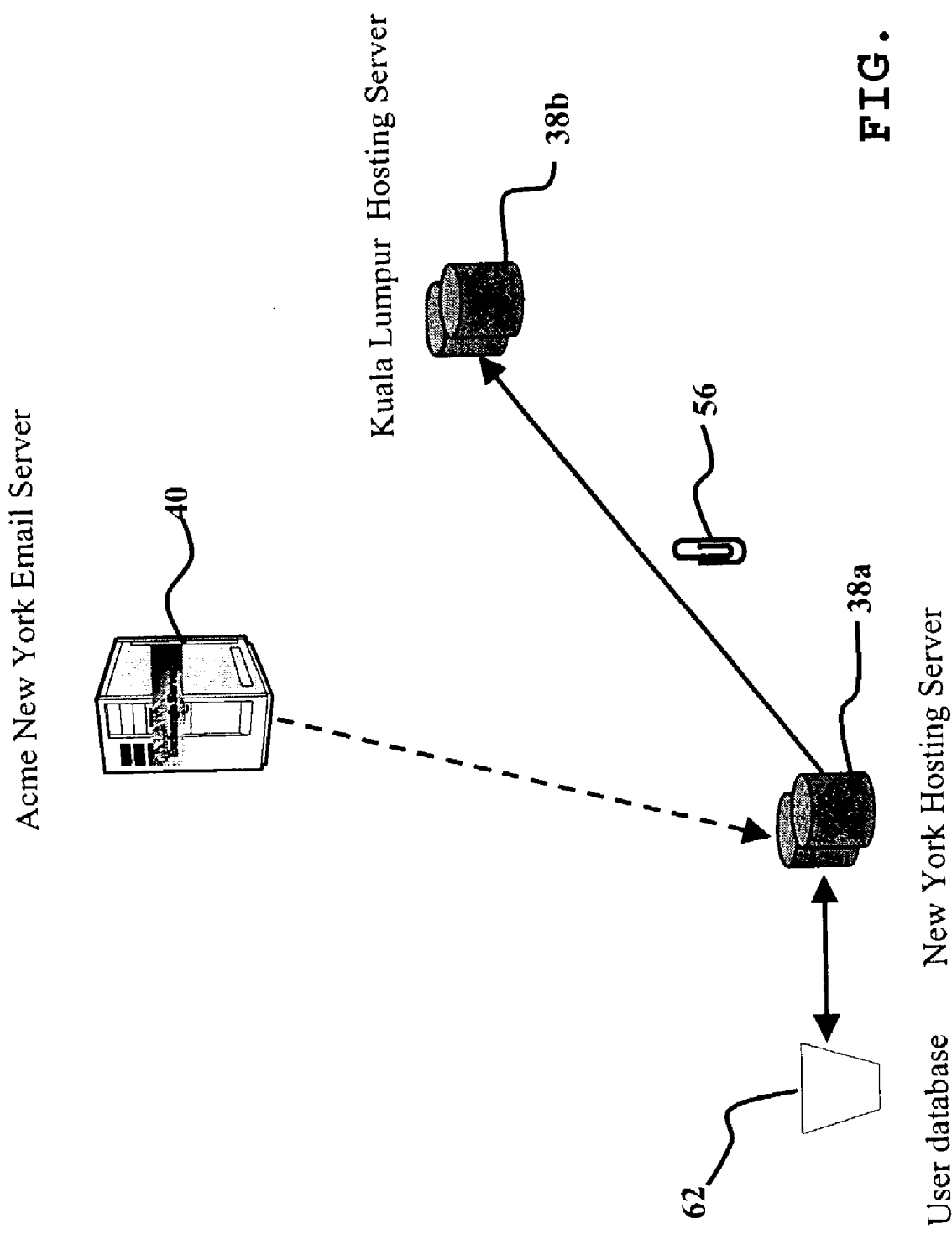

FIG. 6 shows the automation of replication of attachment packets 56 for optimizing the delivery to registered recipient systems 102. In this example, Jane 202 has already used this system and has a registered profile indicating a Kuala Lumpur hosting server 38b as the hosting server. Therefore, as soon as the New York hosting server 38a receives the new attachment packet 56, it looks at the meta-data to check if any of the recipient systems 102 are registered with its database. Since Jane 202 is already registered, the attachment packet 56 is scheduled for replication in the background to the preferred location for Jane 202, in this example, the Kuala Lumpur hosting server 38b. Since Jim 204 and Lynn 206 are not yet registered no further action is required for the present.

Figure 7:
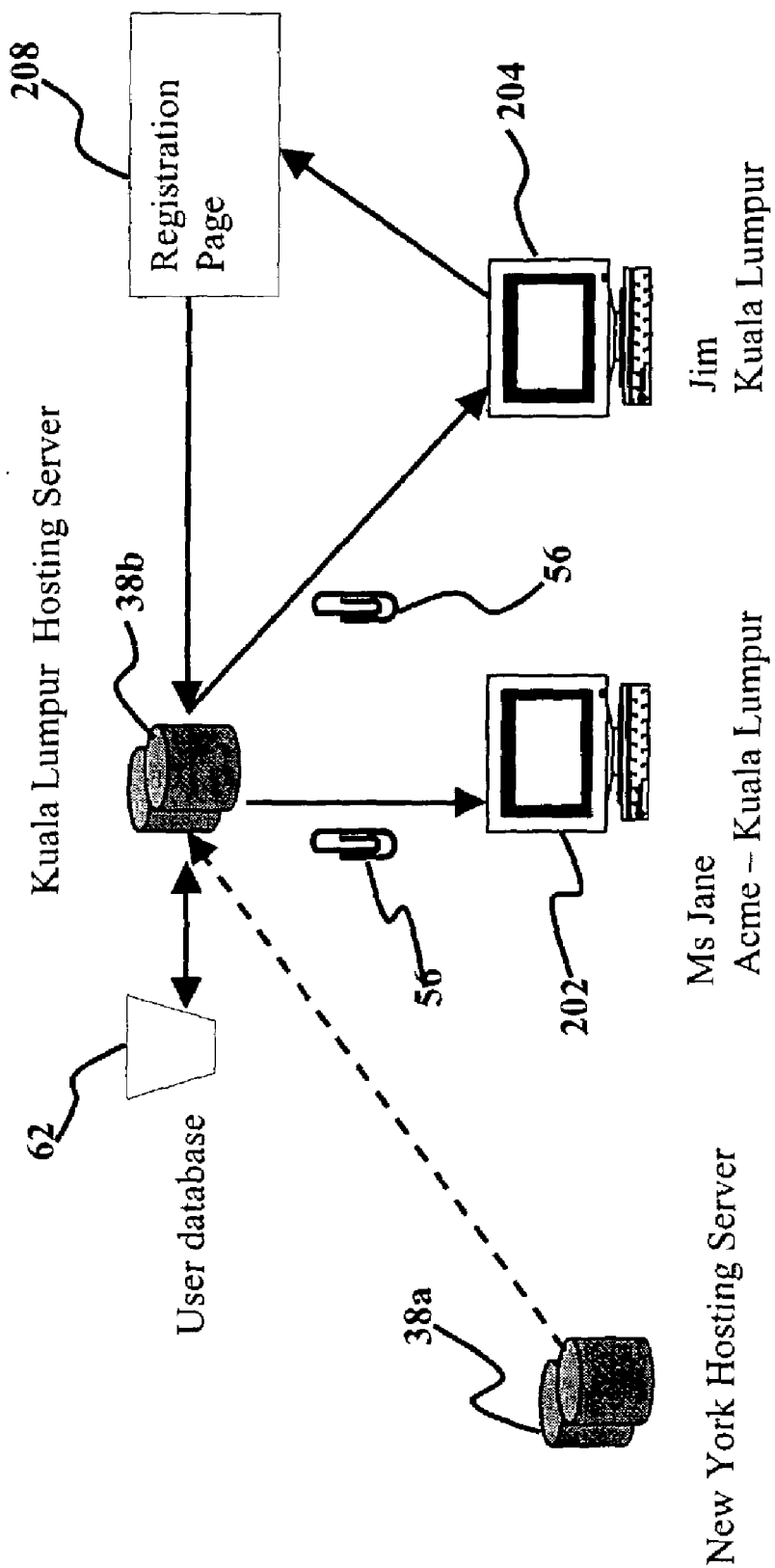

The delivery of the email 42 and attachment packet 56 is shown in FIG. 7 after all the three recipients get the same email 22 with the locator object 58. When Jane 202 clicks on the locator object 58 in the email 42, the attachment packet 56 begins to download immediately from the KL hosting server 38b and no further user action is required. However when Jim 204 clicks on the same locator object 58, a web page 208 is launched for prompting Jim 204 to register his profile with the system by entering his email address, password and a preferred location (selected from a list) for future replication. Jim 204 is then able to select that he too wants to download from the KL hosting server 38b and since the attachment packet 56 is already replicated for Jane 202, Jim 204 also downloads the attachment packet 56 from the KL hosting server 38b. Thus one copy of the attachment packet 56 at KL hosting server 38b would be enough for serving the requirements of all recipients registered with the KL hosting server 38b.

Figure 8:
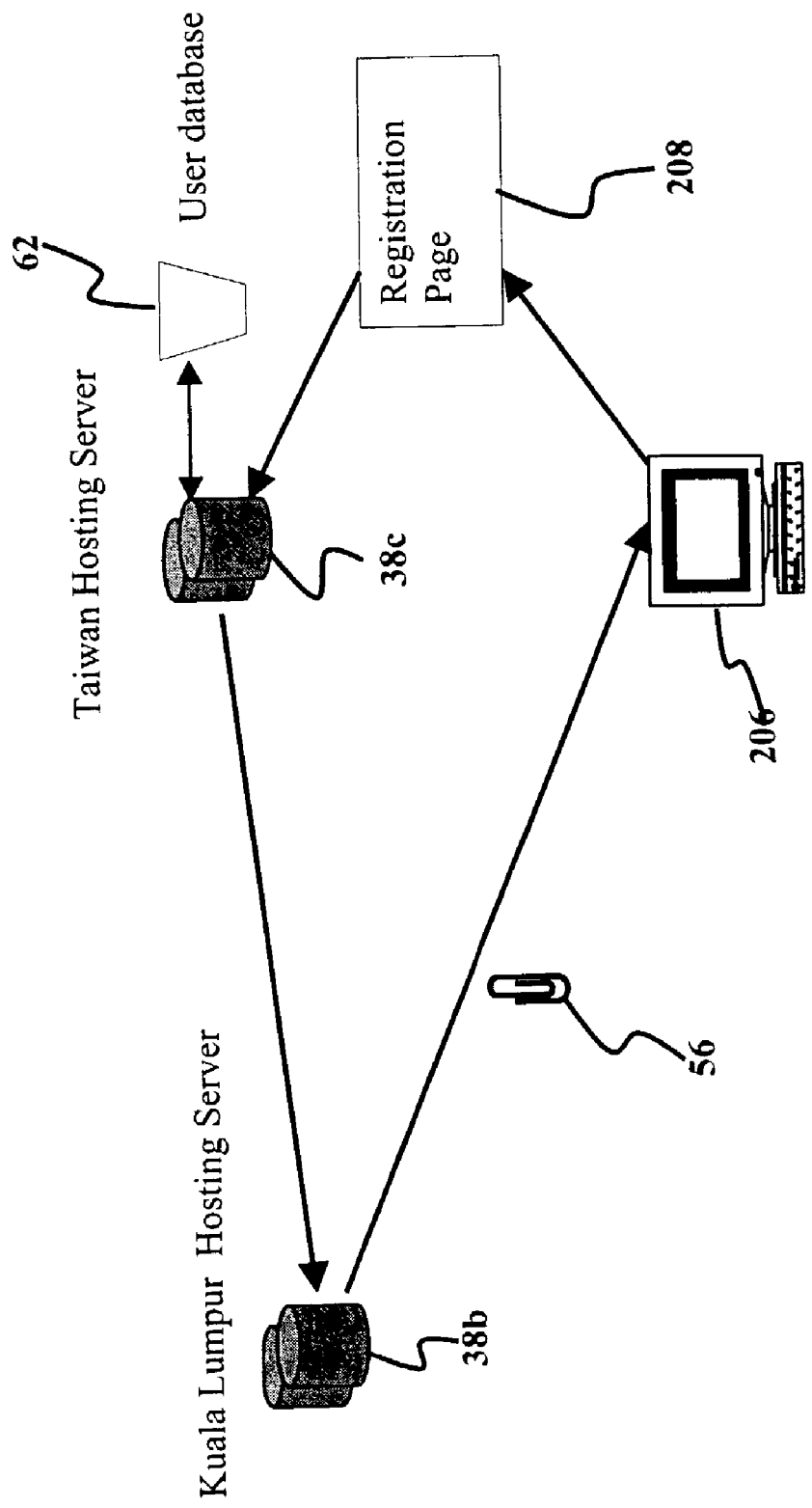

FIG. 8 describes the process of attachment packet 56 delivery to Lynn 206 who is also not registered and upon clicking on the link is prompted to register using the registration page 208 in the same manner as Jim 204 in KL. Lynn 206 selects the closest location which is a Taiwan hosting server 38b and is able to seamlessly download the attachment packet 56 after the registration process. Furthermore, future replication and delivery for Lynn 206 will be based on her specific profile which states the Taiwan hosting server 38c as the preferred location of delivery for her.

Certain embodiments of the present invention fulfill the need for a high-speed, distributed file transfer and storage enhancement of an existing corporate email infrastructure and enable enterprises to significantly improve their collaborative environment, while providing a platform for future application integration.

Although only certain embodiments of the invention have been disclosed, it will be apparent to one skilled in the art in view of this disclosure that numerous changes and/or modifications can be made without departing from the scope and spirit of the invention.

What is claimed is:

1. A computer implemented attachment distribution method comprising the steps of:
    processing an email having a message portion and an attachment portion by a detacher to identify and thereby isolate at least one of the message portion and the attachment portion of the email from the other, the email having a source system and a destination system being associated thereto;
    generating metadata in response to the email being processed, the metadata for packaging with the attachment portion of the email by the detacher to form an attachment packet, the metadata being descriptive of the email;
    generating a locator code by the detacher for storing onto a database, the database being in operative association with the detacher;
    generating a locator object from the locator code by the detacher and embedding the locator object into the message portion of the email to form a message packet;
    delivering the attachment packet to a holding server by an uploader, the attachment packet having an attachment address, the attachment address identifying the holding server and being indicative of the location of the attachment packet within the holding server, the attachment address being stored onto the database and being associated with the locator code, the uploader being operatively associated with the detacher and the uploader being in data communication with the holding server; and delivering the message packet to the destination system.

2. The attachment distribution method as in claim 1, further comprising the steps of:
    receiving the message packet by the destination system;
    activating the locator object in the message packet;
    locating the attachment packet in response to the locator object being activated; and
    delivering the attachment packet from the holding server to the destination system in response to the attachment packet being located.

3. The attachment distribution method as in claim 2, the step of locating the attachment packet comprising the steps of:
    determining the attachment address associated with the locator code corresponding with the locator object; and
    identifying the holding server containing the attachment packet in response to the attachment address being determined, the holding address being indicated by the attachment address.

4. The attachment distribution method as in claim 2, the step of delivering the attachment packet from the holding server to the destination system comprising the steps of:
    receiving an authorisation key provided by the destination system; and
    delivering the attachment packet from the holding server to the destination system by the holding server in response to the authorisation key being received by the holding server.

5. The attachment distribution method as in claim 1, the step of processing an email having a message portion and an attachment portion comprising the steps of:
    verifying compliance of the email with at least one processing rule, the processing rule being pre-defined; and
    detaching each of the attachment portion and the message portion of the email from the email upon verifying compliance of the email with the at least one processing rule.

6. The attachment distribution method as in claim 5, the step of verifying compliance of the email with at least one processing rule comprising the steps of:
    obtaining the attachment size of the attachment portion of the email; and
    verifying compliance of the attachment size with a reference attachment size, the attachment size being at least of the reference attachment size for compliance therewith.

7. The attachment distribution method as in claim 6, the step of verifying compliance of the email with at least one processing rule further comprising the steps of:
    providing a reference source list, the reference source list containing at least one source system;
    matching the source system associated with the email with the at least one source system contained in the reference source list; and
    verifying compliance of the source system of the email with the reference source list, the source system of the email existing in the reference source list for compliance therewith.

8. The attachment distribution method as in claim 6, the step of verifying compliance of the email with at least one processing rule further comprising the steps of:
    providing a reference destination list, the reference destination list containing at least one destination system;
    matching the destination system associated with the email with the at least one destination system contained in the reference destination list; and
    verifying compliance of the destination system of the email with the reference destination list, the destination system of the email existing in the reference destination list for compliance therewith.

9. The attachment distribution method as in claim 1, the step of generating metadata comprising the steps of:
    extracting information from the email, the information being descriptive of at least one of the email, the source system and the destination system;
    compiling the information to obtain the metadata; and
    packaging the metadata with the attachment portion of the email to thereby form the attachment packet.

10. The attachment distribution method as in claim 1, the step of generating a locator code by the detacher comprising the step of:
    generating the locator code by the detacher, the locator code being one of a uniform resource locator (URL), a uniform resource identifier (URI) and a uniform resource name (URN).

11. The attachment distribution method as in claim 1, the step of delivering the attachment packet to a holding server by an uploader comprising the steps of:
    selecting a server from a server list containing a plurality of servers, the plurality of servers being arranged in sequence based on preference;
    determining readiness of the selected server for receiving the attachment packet;
    identifying the selected server as the holding server in response to the readiness of the selected server being determined;
    loading the attachment packet onto the selected server by the uploader in response to the readiness of the preferred server being determined; and storing the attachment address of the attachment packet onto the database and associating the attachment address with the corresponding locator code, the attachment address indicating the selected server as the holding server.

12. The attachment distribution method as in claim 11 further comprising the steps of:
identifying presence of a preferred server being associated with the destination system;
determining readiness of the selected server for receiving the attachment packet in response to the preferred server being present;
identifying the preferred server as the holding server in response to the readiness of the preferred server being determined;
loading the attachment packet from the selected server onto the holding server by the selected server in response to the readiness of the preferred server being determined; and
storing the attachment address of the attachment packet onto the database and associating the attachment address with the locator corresponding locator code, the attachment address indicating the preferred server as the holding server.

13. A computer implemented attachment distribution system comprising:
means for processing an email having a message portion and an attachment portion by a detacher to identify and thereby isolate at least one of the message portion and the attachment portion of the email from the other, the email having a source system and a destination system being associated thereto;
means for generating metadata in response to the email being processed, the metadata for packaging with the attachment portion of the email by the detacher to form an attachment packet, the metadata being descriptive of the email;
means for generating a locator code by the detacher for storing onto a database, the database being in operative association with the detacher;
means for generating a locator object from the locator code by the detacher and embedding the locator object into the message portion of the email to form a message packet;
means for delivering the attachment packet to a holding server by an uploader, the attachment packet having an attachment address, the attachment address identifying the holding server and being indicative of the location of the attachment packet within the holding server, the attachment address being stored onto the database and being associated with the locator code, the uploader being operatively associated with the detacher and the uploader being in data communication with the holding server; and means for delivering the message packet to the destination system.

14. The attachment distribution system as in claim 13, further comprising:
means for receiving the message packet by the destination system;
means for activating the locator object in the message packet;
means for locating the attachment packet in response to the locator object being activated; and
means for delivering the attachment packet from the holding server to the destination system in response to the attachment packet being located.

15. The attachment distribution system as in claim 14, the means for locating the attachment packet comprising:
means for determining the attachment address associated with the locator code corresponding with the locator object; and
means for identifying the holding server containing the attachment packet in response to the attachment address being determined, the holding address being indicated by the attachment address.

16. The attachment distribution system as in claim 14, the means for delivering the attachment packet from the holding server to the destination system comprising:
means for receiving an authorization key provided by the destination system; and
means for delivering the attachment packet from the holding server to the destination system by the holding server in response to the authorization key being received by the holding server.

17. The attachment distribution system as in claim 13, the means for processing an email having a message portion and an attachment portion comprising:
means for verifying compliance of the email with at least one processing rule, the processing rule being predefined; and
means for detaching each of the attachment portion and the message portion of the email from the email upon verifying compliance of the email with the at least one processing rule.

18. The attachment distribution system as in claim 17, the means for verifying compliance of the email with at least one processing rule comprising:
means for obtaining the attachment size of the attachment portion of the email; and
means for verifying compliance of the attachment size with a reference attachment size, the attachment size being at least of the reference attachment size for compliance therewith.

19. The attachment distribution system as in claim 18, the means of verifying compliance of the email with at least one processing rule further comprising:
means for providing a reference source list, the reference source list containing at least one source system;
means for matching the source system associated with the email with the at least one source system contained in the reference source list; and
means for verifying compliance of the source system of the email with the reference source list, the source system of the email existing in the reference source list for compliance therewith.

20. The attachment distribution system as in claim 18, the means for verifying compliance of the email with at least one processing rule further comprising:
means for providing a reference destination list, the reference destination list containing at least one destination system;
means for matching the destination system associated with the email with the at least one destination system contained in the reference destination list; and
means for verifying compliance of the destination system of the email with the reference destination list, the destination system of the email existing in the reference destination list for compliance therewith.

21. The attachment distribution system as in claim 13, the means for generating metadata comprising:
means for extracting information from the email, the information being descriptive of at least one of the email, the source system and the destination system;

means for compiling the information to obtain the metadata; and means for packaging the metadata with the attachment portion of the email to thereby form the attachment packet.

22. The attachment distribution system as in claim 13, the means for generating a locator code by the detacher comprising:

means for generating the locator code by the detacher, the locator code being one of a uniform resource locator (URL), a uniform resource identifier (URI) and a uniform resource name (URN).

23. The attachment distribution system as in claim 13, the means for delivering the attachment packet to a holding server by an uploader comprising:

means for selecting a server from a server list containing a plurality of servers, the plurality of servers being arranged in sequence based on preference;

determining readiness of the selected server for receiving the attachment packet;

means for identifying the selected server as the holding server in response to the readiness of the selected server being determined;

means for loading the attachment packet onto the selected server by the uploader in response to the readiness of the preferred server being determined; and means for storing the attachment address of the attachment packet onto the database and associating the attachment address with the corresponding locator code, the attachment address indicating the selected server as the holding server.

24. The attachment distribution system as in claim 23 further comprising:

means for identifying presence of a preferred server being associated with the destination system;

means for determining readiness of the selected server for receiving the attachment packet in response to the preferred server being present;

means for identifying the preferred server as the holding server in response to the readiness of the preferred server being determined;

means for loading the attachment packet from the selected server onto the holding server by the selected server in response to the readiness of the preferred server being determined; and means for storing the attachment address of the attachment packet onto the database and associating the attachment address with the locator corresponding locator code, the attachment address indicating the preferred server as the holding server.

* * * * *